United States Patent [19]

Dam

[11] 4,353,094

[45] Oct. 5, 1982

[54] ADJUSTABLE YOKE ASSEMBLY

[75] Inventor: Robert Dam, Paletine, Ill.

[73] Assignee: Zenith Radio Corporation, Glenview, Ill.

[21] Appl. No.: 200,805

[22] Filed: Oct. 27, 1980

[51] Int. Cl.[3] ........................ H04N 5/64; H04N 5/655

[52] U.S. Cl. ..................................... 358/249; 335/210

[58] Field of Search ................ 358/248, 249; 335/210, 335/212, 213

[56] References Cited

U.S. PATENT DOCUMENTS 4,038,621 7/1977 Chiodi et al. ....................... 335/210

*Primary Examiner*—Joseph A. Orsino, Jr.
*Attorney, Agent, or Firm*—Jack Kail

[57] ABSTRACT

An adjustable yoke assembly for a CRT (cathode ray tube) is described for optimizing the orthogonality and concentricity between the yoke's horizontal and vertical fields in order to obtain a desired raster shape. The yoke assembly includes a liner which carries one deflection winding, a core which carries another deflection winding and which is mounted on the liner, and an adjustment ring which is mounted on the liner and fixed to the core. The liner includes at least one elongated member which projects radially outwardly from the liner so as to engage detent means, such as serrations, carried by a finger which projects outwardly from the adjustment ring. When the core is manually rotated on the liner to adjust the relative position of the deflection windings, the adjustment ring rotates with the core in a detented manner to provide accurate positioning of the core's winding and optimum orientation of the yoke's horizontal and vertical fields.

13 Claims, 8 Drawing Figures

ADJUSTABLE YOKE ASSEMBLY

BACKGROUND OF THE INVENTION

The present invention is directed generally to television receivers, and particularly to yoke assemblies for such receivers.

Television receivers usually include a CRT (cathode ray tube) whose neck is fitted with a yoke assembly to control the deflection of the receiver's electron beams. The yoke assembly normally includes a liner which mates with the neck of the CRT and which supports a "horizontal" winding to effect horizontal deflection of the electron beam. A ferrite core slips over the liner and carries a "vertical" winding to deflect the electron beams in a vertical direction.

Normally, the orientation of the liner with respect to the core is such that the theoretical axes of the horizontal and vertical windings are perpendicular to each other. However, it is sometimes desirable to be able to manually rotate the vertical winding with respect to the horizontal winding to compensate for inconsistencies in the manner in which the windings are formed and other manufacturing variables. At the same time, it is important that axial concentricity between the windings is maintained. Such adjustment has been found to be particularly desirable for CRTs used in television projection systems. In the latter type of system, the color images from three CRTs are projected onto a viewing screen such that a combined image is developed. Because of the need for precise registry among the three color images, it is desirable to be able to provide for precise alignment between the vertical and horizontal winding associated with each CRT.

The present invention provides a reliable and easily adjustable yoke assembly which enables the horizontal and vertical windings to be precisely adjusted with respect to each other.

OBJECTS OF THE INVENTION

It is a general object of the invention to provide an improved yoke assembly for a cathode ray tube.

It is a more specific object of the invention to provide such a yoke assembly which permits the windings carried by the assembly to be easily adjusted to obtain a precise angular relationship between the windings while maintaining axial concentricity between the windings.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figure 1:
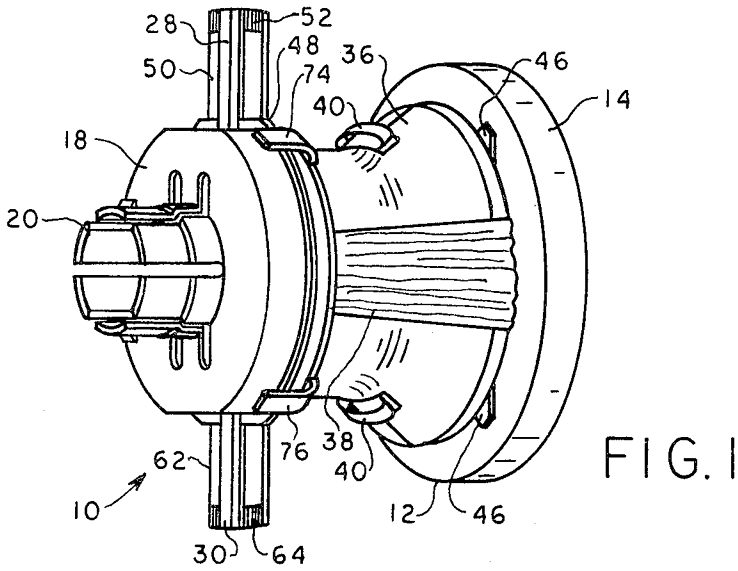
FIG. 1 is a perspective view of an assembled yoke assembly according to the invention.
Figure 2:
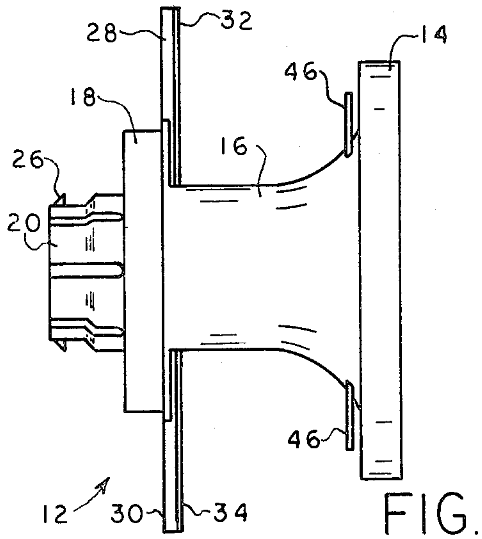
FIG. 2 is a side view of the liner shown in FIG. 1.
Figure 3:
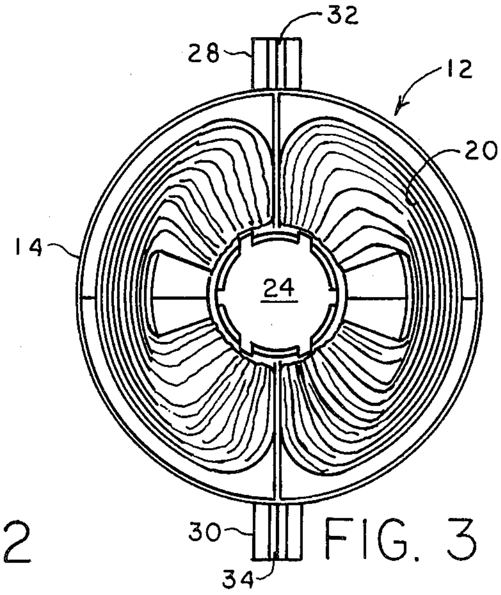
FIG. 3 is a front view of the liner illustrating the winding carried by the liner.
Figure 8:
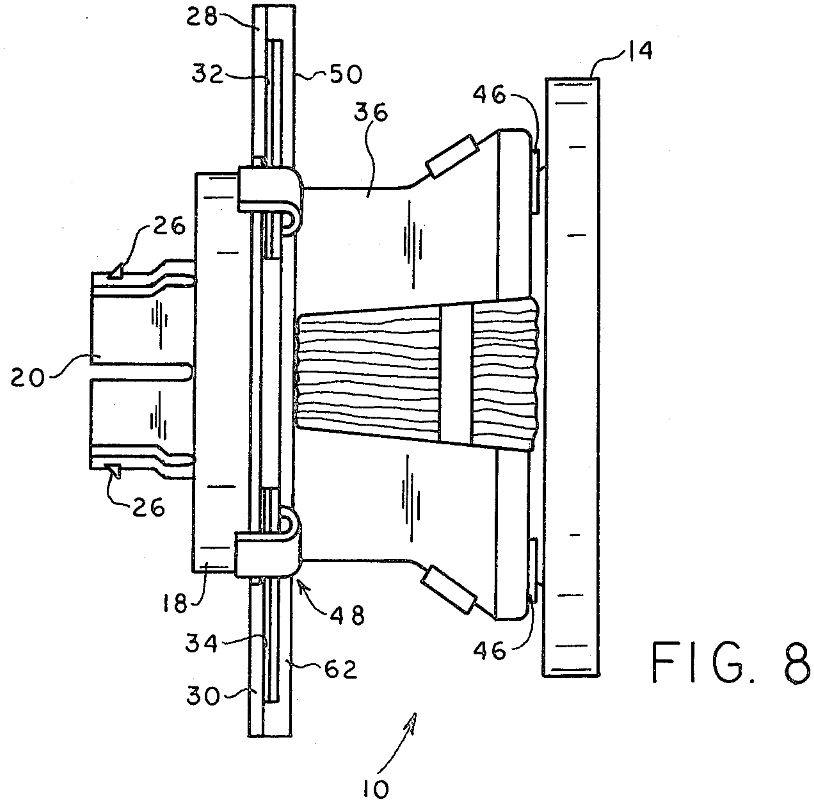
FIG. 8 is a side view of the yoke assembly shown in FIG. 1.

Referring to the Figures, and particularly to FIGS. 1 and 8, a yoke assembly 10 is shown for accurately positioning a pair of deflection windings on the neck of a cathode ray tube (not shown). The yoke assembly 10 includes a plastic liner 12 having a lower circular flare 14 (see FIGS. 2 and 3 also), a central trunk or so-called "liner contour" 16, an upper circular flare 18, and a neck 20. As shown in FIG. 3, the lower flare 14 flares inwardly toward the liner contour 16 for mounting a horizontal deflection coil 20 inside the liner in a conventional manner.

A central opening 24 (FIG. 3) extends axially through the liner 12 to receive the neck of a cathode ray tube. When the liner is mounted on the cathode ray tube, a clamp (not shown) is ordinarily placed around the liner's neck 20 and tightened to secure the yoke assembly to the neck of the tube. Tabs 26 (FIG. 2) may be integrally molded with the liner to position the clamp.

Projecting radially outwardly from the liner's upper flare 18 is a pair of elongated members 28 and 30 which carry ribs 32 and 34, respectively. As described in more detail below, the members 28 and 30 and their associated ribs are employed to properly position the deflection windings relative to each other.

Situated near the liner's lower flare 14 are spring means in the form of resilient tabs 46. As described more fully hereinafter, the tabs flex toward the lower flare 14 to urge a core assembly into close fit with the upper flare 18.

Figure 4:
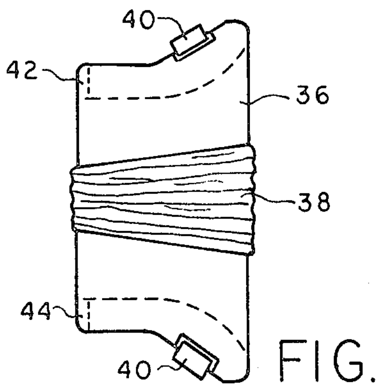
FIG. 4 is a side view of the core shown in FIG. 1, including the winding mounted on the core.
Figure 5:
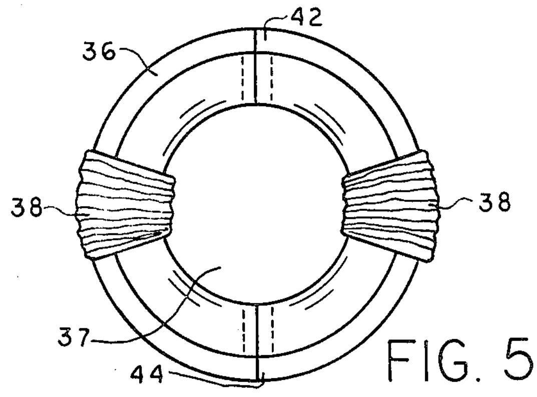
FIG. 5 is a front view of the core shown in FIG. 4.

Mounted on the outer surface of the liner's contour 16 between the lower flare 14 and the upper flare 18 is a ferrite core 36 (FIGS. 1 and 8). As shown most clearly in FIGS. 4 and 5, the core 36 has a generally annular opening 37 and is split into halves, each half of the core carrying a vertical deflection winding 38. After the core halves are mounted on the liner 12, they may be secured together by spring clips 40 which engage notches in the outer surface of the core. Additional notches 42 and 44 are disposed on the end of the core 36 which faces the upper flare 18 in order to hold an adjustment ring described below.

A conventional core is normally mounted on its liner so that the theoretical axis of the horizontal winding is perpendicular to the theoretical axis of the vertical winding. The core is then fixed in place on the liner. However, tolerances in the windings and in their locations on the core and liner may cause the fields created by the windings to produce a less than satisfactory raster shape as generated by the scanning of the cathode ray tube's electron beam. This is particularly true in television projection systems of the type which employ three single beam cathode ray tubes, one tube for each of the primary colors. Winding tolerances in such systems are more critical than in conventional cathode ray tubes of the three beam type.

In order to correct for such tolerances, the present yoke assembly includes an adjustment ring 48 which is mounted fixedly to the end of the core 36 nearer the upper flare 18. See FIGS. 1 and 8. As described below, the ring 48 includes at least one finger 50 which projects radially outwardly from the ring and which carries detent means in the form of closely spaced serrations 52 on the distal end of the finger 50. These serrations engage the rib 32 (FIG. 2) which extends from the liner's elongated member 28. With the core 36 mounted loosely on the liner 12, a rotational force is manually applied to the core 36 to rotate the winding 38 to a desired position relative to the winding 20. As the coil rotates, the finger 50 on the adjustment ring also rotates. Because of the engagement between the rib 32 and the serrations 52 on the finger 50, the core rotates in a series of small, detented increments. Thus, a "detent feel" is achieved as the core is rotated so that the core can be accurately positioned and held in a desired position.

Figure 6:
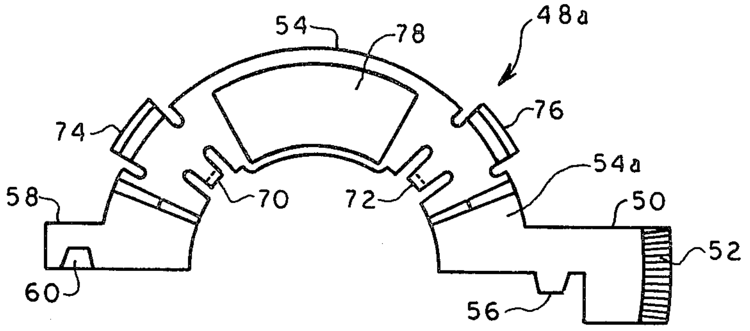
FIG. 6 is a top view of one of the ring halves which form the adjustment ring shown in FIG. 1.
Figure 7:
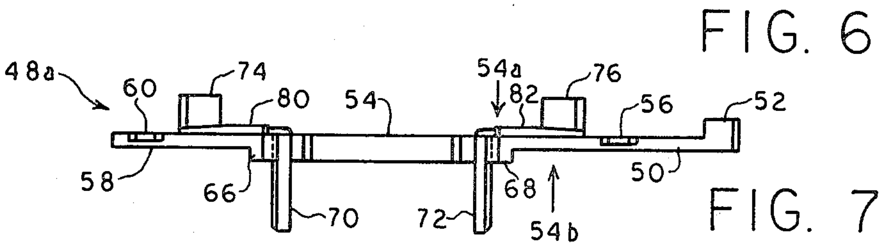
FIG. 7 is a side view of the ring half shown in FIG. 6.

The adjustment ring 48 is preferably split into two similar halves for ease of mounting it on the core and liner. One such half 48*a* is shown in FIGS. 6 and 7, to which reference is now made.

As shown, the ring half 48*a* includes a generally flat body 54 from which a finger 50 extends radially outwardly. The distal end of the finger 50 carries the serrations 52. Also, extending from the finger 50 is a tongue 56. The other side of the half ring carries an extension 58 in which a slot 60 is formed.

The other half ring (not shown) is similar or identical to the half ring 48*a* and includes a tongue such as tongue 56 and a slot such as the slot 60. To mate the ring halves together, the tongue 56 in ring half 48*a* is inserted into a slot (similar to slot 60) in the non-illustrated ring half. Also, the slot 60 receives a tongue (similar to tongue 56) on the non-illustrated ring half. Thus, the two ring halves are interlocked by their respective tongues and slots.

The other ring half also includes a finger 62 (FIG. 1) similar to finger 50 and serrations 64 on the distal end of the finger 62. Thus, when the two ring halves are joined together and mounted on the core and liner as shown in FIGS. 1 and 8, the rib 34 (FIG. 2) on the liner's member 30 engages the serrations 64, and the rib 32 engages the serrations 52.

Referring again to FIGS. 6 and 7, the ring half 48*a* may be considered as having an upper side 54*a* and a lower side 54*b*. Protruding downwardly from the upper side 54*a* is a pair of ribs 66 and 68. When the half ring is mounted on the core 36, the lower side 54*b* faces the core 36 and the ribs 66 and 68 engage the notches 42 and 44 (FIG. 5) in the core to align the adjustment ring with the core. The non-illustrated half ring has similar ribs which engages the notches 42 and 44.

Also protruding downwardly from the upper side of the half ring 48*a* is a pair of resilient projections 70 and 72. When the adjustment ring is mated with the core 36, these projections extend into the core's opening 37 (FIG. 5) so as to hold the adjustment ring in a position concentric with the core.

Additional resilient projections 74 and 76 extend upwadly from the ring's upper side 54*a*. With the ring and core mated with the liner, the projections 74 and 76 extend toward and grasp the outer periphery of the liner's upper flare 18, as shown in FIG. 1, so as to center the adjustment ring and the core with respect to the liner.

A window 78 (FIG. 6) extends through the ring's body 54 so that, when the ring is mated with the core 36, one of the windings 38 carried by the core may protrude through the window 78. The other half ring has a similar window to accept the other of the core's windings.

Mounted on the half ring's upper side 54*a* are two lands 80 and 82 which make contact with the liner's flare 18 when assembled as in FIG. 1. The purpose of the lands is to control the axial position on the liner and to control the interference fit which occurs between the serrations 52 and 64 and the liner's ribs 32 and 34.

To assemble the complete yoke assembly, the two halves of the core 36 are clamped together. (The windings 38 will have been previously mounted on the core halves). The two ring halves are then mated with each other and mounted on the core 36 such that the projections 70 and 72 fit in the core's opening 37 and the ring's ribs 66 and 68 mate with the notches 42 and 44 in the core. The ring may then be secured to the core by epoxy and oven cured.

The clamp on the core is then removed and the core is again separated into halves, each core half carrying a ring half. Both core halves are then mounted on the liner's contour 16 such that the ring's halves are interlocked and such that the ring's serrations 52 and 64 are approximately centered with respect to the liner's ribs 32 and 34, respectively. Clips 40 (FIG. 4) are also installed to hold the core halves together. Resilient projections 74 and 76 act to maintain axial concentricity between the core and the liner. With this arrangement, the resilient tabs 46 (FIG. 2) near the liner's lower flare 14 flex to urge the core ring assembly toward the liner's upper flare 18 to provide an interference fit between the ring's serrations and 64 and the liner's ribs 32 and 34.

The entire assembly, as shown in FIG. 1, is then placed on the neck of a CRT and held in place by a clamp (not shown) around the neck 20 of the liner. With the CRT and the deflection windings energized, the core is manually rotated on the liner 16 until the desired raster shape is attained. Preferably, the serrations 52 (and 64) are spaced to provide detenting at one-half degree rotations of the core. Hence, very fine adjustment of the core (and its winding) is possible, and each incremental adjustment is maintained without slippage by virtue of this detent action.

When the desired raster shape is attained, the liner's members 28 and 30 may be permanently fixed to the fingers 50 and 62 by epoxy or any suitable adhesive or clamp in order to hold the core and ring at their adjusted positions. The core 36 may also be directly fixed to the liner 12 by epoxy or the like.

In light of the description above, it will be appreciated that a reliable and easily adjustable yoke assembly is provided for enabling the horizontal and vertical deflection windings to be precisely adjusted with respect to each other. The critical orientation of the horizontal and vertical fields required in one-gun CRTs used in television projection systems is easily obtained with the yoke assembly. The assembly is, of course, also usefully employed to improve convergence in conventional three-gun CRTs.

Although the invention has been described in terms of a preferred embodiment, it will be obvious to those skilled in the art that many alterations and modifications may be made to it without departing from the invention. Accordingly, it is intended that all such modifications and alterations be considered as within the spirit and scope of the invention as defined by the appended claims.

What is claimed is:

1. In a cathode ray tube yoke assembly which includes a liner carrying a first winding and a core mounted on the liner and carrying a second winding, a mechanism for accurately positioning the second winding relative to the first winding, comprising:

at least one elongated member which projects radially outwardly from the liner; and a ring adapted to mate fixedly with the core and carrying at least one finger which projects radially outwardly from the ring and which carries detent means such that, when the ring is mated with the core on the liner, said detent means engages said elongated member so that the core may be manually rotated with respect to the liner in a series of detented increments, thereby to accurately adjust the relative positions of the windings.

2. A mechanism as set forth in claim 1 wherein the core has a generally annular opening extending from one end of the core to an opposite end thereof, wherein said ring is adapted to be mated with one end of the core, and wherein said ring carries resilient projections for extending into the core's opening so as to hold the ring in a position concentric with the core.

3. A mechanism as set forth in claim 2 wherein the liner includes an upper flare and a lower flare, wherein the core and ring are adapted to be carried between the upper and lower flares with said ring adjacent the upper flare, and wherein said ring includes additional resilient projections extending toward the liner's upper flare and positioned on the ring so as to center the ring and the core with respect to the liner.

4. A mechanism as set forth in claim 1 wherein said detent means includes a group of closely spaced serrations on the ring's finger, and wherein the elongated member carried by the liner includes a rib for engaging the serrations.

5. A mechanism as set forth in claim 4 wherein the liner includes an upper flange and a lower flare, wherein the core and ring are adapted to be carried between the liner's upper and lower flares with the ring adjacent the upper flare, wherein the liner's elongated member is carried by the liner's upper flare, and wherein the liner includes spring means disposed near the lower flare for urging the core and ring toward the upper flare so as to create an interference fit between the serrations on the ring's finger and the rib on the liner's elongated member.

6. A mechanism as set forth in claim 1 wherein said ring is split into two similar half rings adapted to be mated together, and wherein each half ring includes means for interlocking it with the other half ring.

7. A mechanism as set forth in claim 6 wherein each half ring carries a finger which projects radially outwardly from the half ring and which carries serrations at the outward end thereof, and wherein the liner carries a pair of elongated members each having an outer end carrying a rib for engaging the serrations in one of the fingers on a half ring.

8. A yoke assembly for accurately positioning horizontal and vertical deflection windings on a cathode ray tube, comprising:

a liner adapted to carry one of the deflection windings, having an upper flare separated from a lower flare by a liner contour, and carrying at least one elongated member projecting radially outwardly from the upper flare;

a core adapted to carry the other deflection winding, and adapted to be carried on the liner between the upper and lower flares; and an adjustment ring adapted to mate fixedly with the core so as to be carried between the core and the upper flare of the liner, said ring having at least one finger which projects radially outwardly from the ring and which carries detent means disposed to engage with the liner's elongated member so that the core may be manually rotated with respect to the liner in a series of detented increments, thereby to accurately adjust the relative position of the deflection windings.

9. A yoke assembly as set forth in claim 8 wherein the liner includes spring means carried near its lower flare for urging the core and ring toward the upper flare so as to create an interference fit between said detent means and the liner's elongated member.

10. A yoke assembly as set forth in claim 8 wherein the core has a generally annular opening extending from one end of the core to an opposite end thereof, and wherein said ring carries resilient projections for extending into the core's opening so as to hold the ring in a position concentric with the core.

11. A yoke assembly as set forth in claim 10 wherein said ring includes additional resilient projections extending toward the liner's upper flare and positioned on the ring so as to engage with the upper flare and center the ring and the core with respect to the liner.

12. A yoke assembly as set forth in claim 8 wherein said ring is split into two similar half rings adapted to be mated together, wherein each half ring includes means for interlocking it with the other half ring, wherein each half ring carries a finger which projects radially outwardly and which carries serrations at the outward end thereof, and wherein the liner carries a pair of elongated members each of whose outer ends includes a rib for engaging the serrations in one of the fingers on a half ring.

13. A yoke assembly for accurately positioning horizontal and vertical deflection windings on a cathode ray tube, comprising:

a liner carrying one of the deflection windings, having an upper flare separated from a lower flare by a liner contour, having a pair of elongated, ribbed members projecting radially outwardly from the upper flare, and having a plurality of spring means located on the lower flare so as to flex toward the lower flare;

a ferrite core adapted to carry the other deflection winding and adapted to be mounted on the liner between the upper and lower flares, said core having a generally annular opening extending from one end of the core to an opposite end thereof to receive the liner contour, and having at least one notch in the core end closer to the upper flare; and an adjustment ring adapted to mate fixedly with the core so as to be carried between the core and the upper flange of the liner, said ring having an upper side and a lower side with at least one rib on the lower side for engagement with the notch in the core, having a plurality of resilient projections extending from the ring's lower side into the core's opening so as to hold the ring in a position concentric with the core, having additional resilient projections extending from the ring's upper side toward the liner's upper flare and positioned on the ring so as to engage with the upper flare and center the ring and the core with respect to the liner, and having a pair of fingers which project radially outwardly from the ring and which carry serrations for engagement with the ribbed members on the liner's upper flare, whereby the core may be manually rotated with respect to the liner in a series of discrete increments established by the serrations for accurately adjusting the relative positions of the deflection windings, and the spring means on the liner's lower flare urge the core and adjustment ring toward the upper flare so that an interference fit is created between the serrations and the ribbed member.

* * * * *